UNITED STATES PATENT OFFICE.

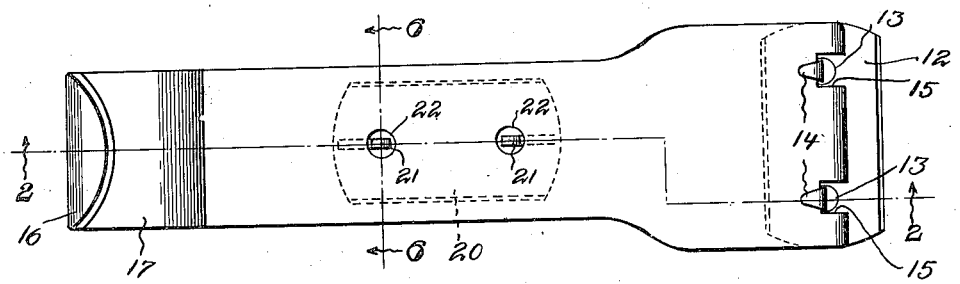
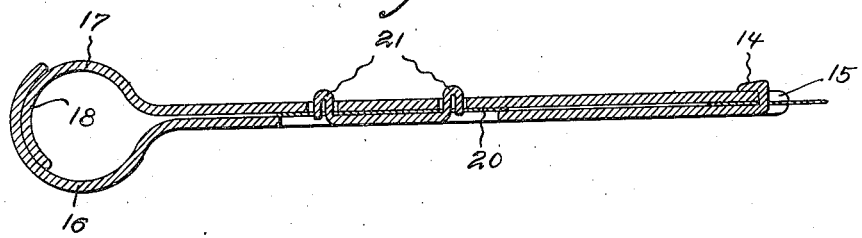
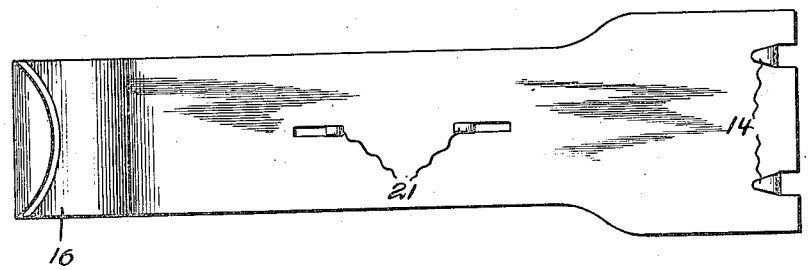

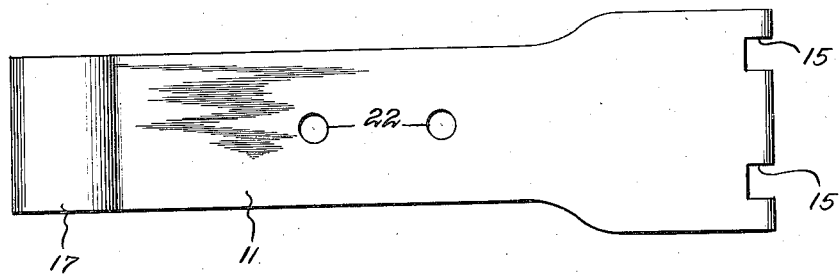
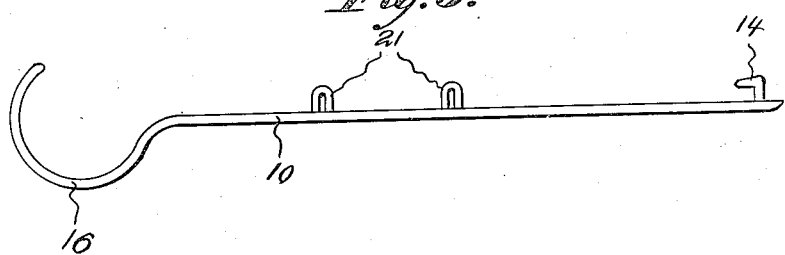
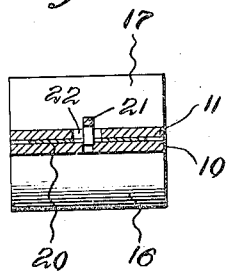

JOHN A. KIMBALL, OF TAYLORVILLE, ILLINOIS.

SCRAPING TOOL.

1,418,189. Specification of Letters Patent. Patented May 30, 1922.

Application filed July 25, 1921. Serial No. 487,538.

*To all whom it may concern:*

Be it known that I, JOHN A. KIMBALL, a citizen of the United States, residing at Taylorville, in the county of Christian and State of Illinois, have invented new and useful Improvements in Scraping Tools, of which the following is a specification.

This invention comprehends the provision of a tool designed for scraping varnish and paint or the like off of glass or other hard substances, and especially advantageous for use by builders, automobile dealers and the like.

The chief characteristic of the present invention resides in providing a handle for a tool of the above mentioned character, and designed to permit the use of safety razor blades therewith.

More specifically stated, the invention comprehends the provision of a tool handle made up of separable sections, the sections being designed for interlocking association in a manner to hold a safety razor blade positioned between the sections.

In carrying out the invention, the respective sections of the handle are also designed for holding the blades between the handles when the tool is not in use, thereby concealing the blade from view, and maintaining it within the confines of the handle sections, so that the handle can be grasped without any possibility of cutting the hands of the user.

A further object of the invention resides in the provision of a tool handle, wherein the respective sections are designed to be snapped together and held fixed relatively in position for use, and at the same time allow the respective sections to be easily and quickly separated when it is desired to change the blade, or to store the blade between the handles in the manner above stated.

The nature and advantages of the invention will be better understood when the following detailed description is read in connection with the accompanying drawings, the invention residing in the construction, combination, and arrangement of parts as claimed.

In the drawings forming part of this application, like numerals of reference indicate similar parts in the several views and wherein:—

Figure 1—is a top plan view of the tool.
Figure 2—is a longitudinal sectional view taken on line 2—2 of Figure 1.
Figure 3—is a plan view of the lower handle section.
Figure 4—is a similar view of the upper handle section.
Figure 5—is an edge elevation of the lower handle section.
Figure 6—is a transverse sectional view taken on line 6—6 of Figure 1.

The tool forming the subject matter of the present invention embodies a handle which is made up of a lower section 10 and an upper section 11, each of these sections being elongated, and slightly wider at one end, between which ends the blade 12 is positioned for use. The handle sections may be constructed from any suitable material having the requisite resiliency to hold the sections operatively associated in the manner to be hereinafter described, and may also vary in size without departing from the spirit of the invention. The blade 12 is a safety razor blade of the wellknown type, having spaced openings 13. The blade is adapted to be positioned between the handle sections, projecting beyond one end thereof when in position for use as clearly illustrated in Figure 1, and in order to hold the blade in this position, the lower handle section 10 is provided with hook-like portions 14 adapted to be passed through the openings 13 in the blade 12. The corresponding extremity of the upper section 11 of the handle is formed with notches 15 to receive the hook-like portions 14 after the latter have been passed through the openings in the blade.

The lower section 10 of the handle has its opposite end curved as at 16, while the corresponding extremity of the upper section 11 of the handle is curved in a direction of the curvature 16, the curved extremity 17 of the upper section being adapted to lie within the curvature 16 of the lower handle section, when the sections are associated for use. These curved extremities are of a resilient nature, so that when the handle sections are pressed together, the upper curved section 17 snaps within the curved extremity 16, to hold the sections fixed relatively. It will be noted that the curved extremities 16 and 17 of the respective sections unitedly define a loop 18 so that the fingers may be inserted within this loop to facilitate the separation of the sections as the occasion requires. In placing the blade 12 in a cutting position, it is laid upon the lower section 10 in a manner whereby the openings 13 of the blade receives the hook-like portions 14. The upper section 11 of the handle is then arranged upon the lower section of the blade, but under the hooks 14, and the curved extremities of the said sections snapped together, thereby holding the handle sections and the blade 12 fixed relatively for use.

A reserve blade 20 may be held between the handle sections, or the cutting blade 12 may be positioned between the handles when not in use in the manner clearly illustrated by dotted lines in Figure 1. For this purpose, the lower handle section 10 is formed with spaced projecting loops 21 adapted to be passed through the openings in the blades and through corresponding openings 22 in the upper section 11 of the handle. Consequently, one or more blades can be stored between the handle sections in a manner whereby the blades will be wholly concealed from view and arranged within the confines of said section, so that the handle may be grasped, without any danger of cutting the hands. Subsequent to the use of the tool, the blade 12 can be easily removed from the handle by separating the sections 10 and 11, after which the blade 12 can be positioned upon the lower section 10 in a manner whereby the openings 13 of the blade receives the loops 21. The upper section is then placed upon the lower section, the loops 21 passing through the openings 22 in the upper section, and the sections snapped together in a manner above described. The invention is very simple in construction, and can be manufactured and sold at a very nominal cost.

While it is believed that from the foregoing description the nature and advantages of the invention will be readily apparent, I desire to have it understood that I do not limit myself to what is herein shown and described, and that such changes may be resorted to when desired as fall within the scope of what is claimed.

What I claim is:

1. A tool of the character described, comprising a handle made up of separable sections, a cutting blade adapted to be positioned between the sections and project beyond one end of the tool, said blade having openings, co-operating means on the respective sections for clamping the blade between the latter, and said sections being designed to unitedly define a loop at the opposite end of the handle, the component parts of said loop being resilient for interlocking association for the purpose specified.

2. A tool of the character described, comprising a handle made up of separable sections, a blade positioned between said sections and arranged to project beyond one end of the handle, said blades having spaced openings, hooks formed on one section to pass through said openings, the other section having notches for the reception of said hooks, said sections being designed for interlocking association when pressed together, loops projecting from the first mentioned section at appropriate points in its length, said loops being adapted to be passed through the openings in the blade when the latter is stored between said sections longitudinally of the latter, and the second mentioned section of the handle having spaced openings for the reception of said loops, whereby said blade is confined within the sections and between said loops.

In testimony whereof I affix my signature.

JOHN A. KIMBALL.